Patented Jan. 20, 1948

2,434,695

UNITED STATES PATENT OFFICE 2,434,695

WATERPROOF CEMENT

William Helms, South Bend, Ind.

No Drawing. Application October 25, 1945,
Serial No. 624,605

5 Claims. (Cl. 106—92)

This invention relates to waterproof cement mixtures, and more particularly is concerned with a composition which can be used as a waterproof sealer for floors and foundation walls, or can be used for bonding purposes, and as a hardening accelerator.

While a number of dry cement mixes have been developed for waterproofing purposes, these mixes are all subject to caking and hardening when not used for a period of time, and, further, require accurate mixing of water therewith in order to produce the proper consistency for application.

The present invention contemplates making a stable aqueous solution consisting of a mixture of calcium chloride and glucose in water. This mixture can then be used with equal parts of cement as a waterproof sealer for floors and foundation walls, being capable of application with a spray gun or a brush. If desired, the mixture can be thickened with a small quantity of sand and applied with a trowel under conditions requiring a thicker coating.

In a preferred example of the mixture, I provide for mixing 100 pounds of calcium chloride with 20 pounds of glucose in 50 gallons of water. This mixture is stirred for a period of time to secure thorough homogeneity, and it is noted that during this process, an appreciable amount of heat is given off. To this mixture is added an equal part of cement. It is to be understood that the term "cement" as used herein, defines the commonly known Portland cement. It can be applied directly over old concrete to act as a bonding agent when additional concrete is to be poured thereon and, in addition, forms an excellent mixture to be used with the cement for use as a mortar in bonding cement blocks or the like together. The solution itself has the characteristic of being permanent, and does not deteriorate under normal aging conditions.

If a thicker consistency of solution is desired for application to floors or foundation walls, swimming pools or similar structures requiring waterproofing, about one-third as much sand as cement may be used, and the mortar like resultant mixture can then be applied with a trowel.

However, where only a waterproof coating is required, the solution of calcium chloride and glucose in water with equal parts of cement can be applied with either a spray gun or a brush.

The present waterproofing mixture can also be used for patching since it takes the shrinkage out of cement or concrete so that patching work applied over old cement or concrete will bond firmly thereto and will not crack away due to shrinkage.

Another advantage of the present composition is that it is not affected by either heat or cold, and can be used under all conditions of temperature, even down to zero weather, without in any way affecting its characteristics as to waterproofing and bonding. This is due to the action of the calcium chloride in the solution.

I have also found that the same mixture can be used with a concrete mix, in which case, about one part of the mixture is used with five parts of water in the regular mix. This forms the regular concrete mix which can be used in pouring either floors, foundations, or the like, and I have found that the use of this mixture in such a concrete mix functions as an excellent hardening medium for accelerating the hardening of the concrete, as well as providing a very excellent bonded and waterproofed concrete. The use of the calcium chloride in combination with the glucose provides a mixture which is hydroscopic in character, and the glucose apparently adds a certain amount of smoothness to the mix so that the resulting concrete produced is very smooth with a very hard surface.

The particular mixture employed can vary somewhat from the example given above, and I have found that a mixture in 50 gallons of water which ranges from 80 to 120 pounds of calcium chloride and from 10 to 30 pounds of glucose will give good results. An equal part of cement, of course, is added to this mixture for waterproofing or bonding purposes, or the mixture with the cement is added to a concrete mixer to provide a regular concrete mix for pouring purposes.

I am aware that various changes may be made in the composition of the mixture, or that its consistency can be varied, depending upon the type of application required, and I therefore do not intend to be limited except as defined by the scope and spirit of the appended claims.

I claim:

1. A liquid waterproofing paint comprising a mixture of calcium chloride and Portland cement in substantially equal parts with about 10% by weight of glucose all mixed homogeneously in water.

2. A stable liquid waterproofing composition able to withstand freezing comprising an aqueous solution of five parts by weight of calcium chloride, a substantially equal amount of cement of the Portland type, and one part by weight of glucose.

3. An aqueous waterproof cement mix capable of retaining its liquid character for indefinite periods and under all normal temperatures down to zero degrees Fahrenheit, comprising six parts by weight of Portland cement, five parts by weight of calcium chloride, and one part by weight of glucose mixed with approximately twenty parts by weight of water.

4. An aqueous waterproof cement mix capable of retaining its liquid character for indefinite periods and under all normal temperatures down to zero degrees Fahrenheit, comprising six parts by weight of Portland cement, five parts by weight of calcium chloride, and one part by weight of glucose mixed with water and sand to form a mixture of mortar-like consistency.

5. A stable, non-freezing waterproof cement and bonding mixture comprising calcium chloride, glucose, cement and water mixed in approximately the following proportions:

| | | |
|---|---|---|
| Calcium chloride | pounds | 100 |
| Glucose | do | 20 |
| Portland cement | do | 120 |
| Water | gallons | 50 |

WILLIAM HELMS.

REFERENCES CITED

The following references are of record in the file of this patent:

UNITED STATES PATENTS

| Number | Name | Date |
|---|---|---|
| 1,749,923 | Reardon | Mar. 11, 1930 |

FOREIGN PATENTS

| Number | Country | Date |
|---|---|---|
| 94,175 | Switzerland | Apr. 1922 |
| 436,105 | Great Britain | Oct. 4, 1935 |